United States Patent Office 3,454,287
Patented July 8, 1969

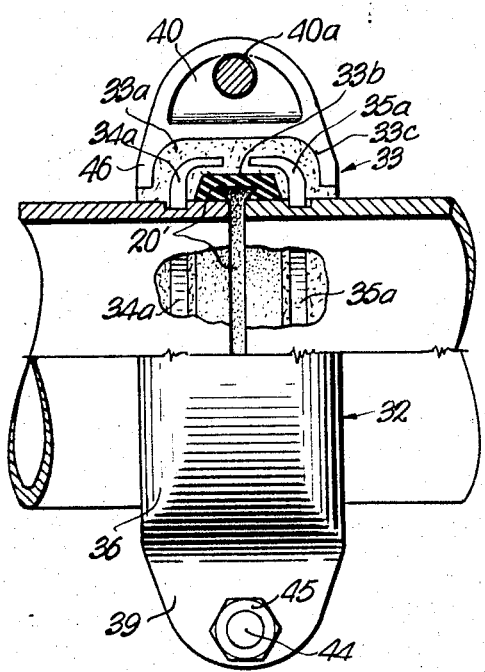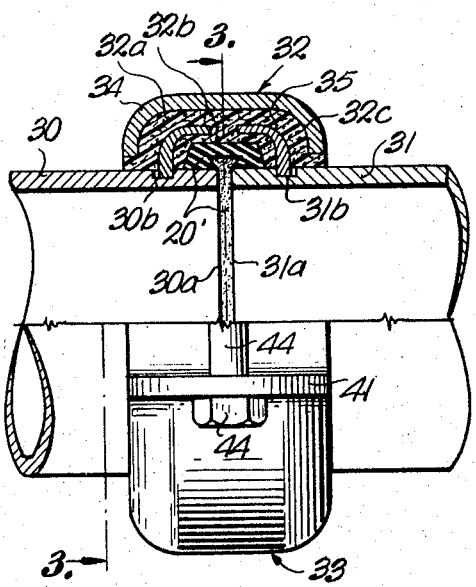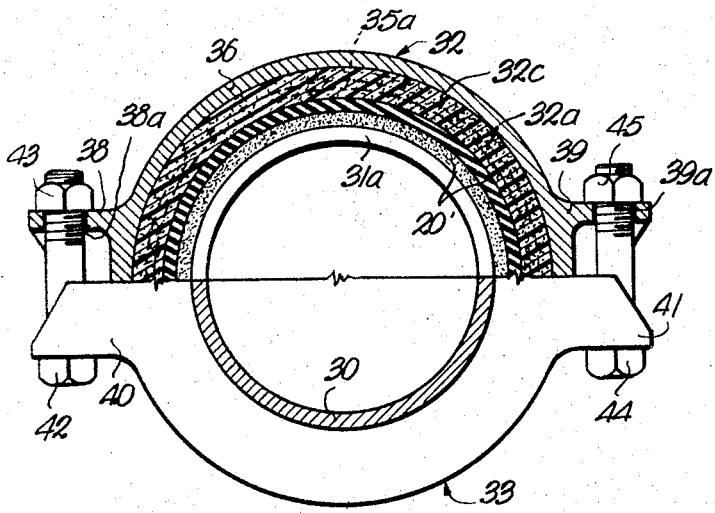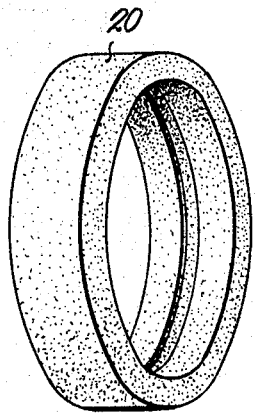
Fig. 1.
Fig. 2.
Fig. 3.
Fig. 4.
INVENTOR.
Leo K. Thiessen

3,454,287
INSULATED COUPLING FOR GROOVED END PIPE
Leo K. Thiessen, Shawnee Mission, Kans., assignor to Certain-Teed Products Corporation, Ardmore, Pa., a corporation of Maryland
Filed June 21, 1967, Ser. No. 647,723
Int. Cl. F16l 59/14
U.S. Cl. 285—50        3 Claims

ABSTRACT OF THE DISCLOSURE

A pipe coupling apparatus for preventing current flow between sections or lengths of pipe thereby aiding in the prevention of corrosion. The coupling is comprised of two 180° arcuate halves molded essentially out of glass fiber reinforced plastic with means for fastening circumferentially around the pipe ends. Metal inserts are mounted therein for engaging grooves in the outer walls of the pipe, thereby securing the pipe sections together but maintaining a spatial gap between the ends. The metal inserts are electrically insulated from each other by the plastic of the main body of the coupling such that no current path exists between sections of the pipe. Included also is a means for incorporating a metal shell for the coupling which provides added strength but does not contact the pipe and therefore provides no current path between pipe sections.

Background of the invention

Corrosion in buried piping is caused by extraneous electrical currents flowing along the surfaces thereof. Such current may be self-generated in such instances as where a first pipe section is buried in one type of soil, while adjoining lengths are covered with another type, where new pipe is linked to old or, further, where dissimilar metals are employed for the piping. Further, such extraneous electrical currents may be induced in a pipeline by the presence of power transmission lines, current carriers for electrified surface transportation systems, or current lines from manufacturing plants using DC electricity.

Such extraneous electrical currents provide ionizing electrical charges which cause atoms of the pipe metal to move away from the surface thereof. Such loss of metal from the pipe surface through electro-chemical activity is named galvanic corrosion and, in time, may result in the effective destruction of the pipe wall.

There can be no galvanic corrosion in the absence of current flow from the pipe. That is, if the metal atoms of the pipe wall and surface cannot pick up positive charges, they do not ionize, they do not detach from the pipe wall surface. The maintenance of a negative electrical condition on the pipe external surface is thus the key to "cathodic protection." Cathodic protection is accomplished by regulation of the direction of electrical current flow along the pipeline or by the sacrificial anode corrosion of a less noble metal. Thus a current of predetermined voltage is impressed on the pipeline or pipeline segment by virtue of setting up a controlled circuit of which the pipe segment being protected is a part. The negative terminal of the circuit is connected to the pipe, with the positive terminal connected to strips of an anodic material such as zinc buried near the pipeline. The protective current then flows from the anode to the cathode, the anodic strips corroding, while the pipe is protected.

A marked cause of trouble in the use of such cathodic protection systems is the presence of other metallic structures in the path of the protective electrical current. Thus, other pipes, wire fences, cables, railroad tracks and the like very often are present in the current carrying zone and such may impose considerable drain on the induced current. Such may considerably increase costs and limit the amount of protection avialable to a given pipeline.

Therefore, in order to protect a specific pipeline structure at a reasonable cost, it is necessary to electricallly separate or isolate it from other structures whose protection is not intended. Furthermore, it may be seen that, when the principle and method of cathodic protection is to be applied to a complicated piping array in a given ground zone, installation and maintenance of the cathodic protection system may be greatly simplified by subdividing and sectionalizing the piping array into relatively small, isolated and separated units to be protected.

Literature on corrosion, per se, includes Kirk-Ohmer "Encyclopedia of Chemical Technology," 2nd ed. ("Corrosion" and "Corrosion Inhibitors") and McGraw-Hill, "Encyclopedia of Science and Technology," 1960, vol. 3 ("Corrosion").

The isolation or electrical sectionalizing of pipeline arrays for cathodic protection is typically and best accomplished by the insertion of current barriers at selected positions within the lines constituting the array, thus achieving the effect of a plurality of electrical curent barriers which will tend to isolate and confine zones to be protected. It is most important that the utilization and emplacement of such dielectric materials and structures be effected so that the desired functional parameters of the given pipelines with respect to pressure capacity and material strength are not degraded.

Summary of the invention

The invention comprises an insulated coupling for joining grooved end pipe which serves an additional function of helping to avoid galvanic corrosion. The main body of each of the coupling halves is fabricated from a nonelectrical current conducting plastic, portions of the coupling halves designed to circumferentially grip the grooves in the pipe ends as to maintain a spatial separation therebetween. The grooves in the pipe ends are specifically engaged by electrically separated metal inserts, each fixedly received within the coupling halves, within the nonelectrical current conducting plastic. Said inserts provide a firm and strong joint without providing a current path between the pipe section. A metal shell for the coupling which provides added strength but does not contact the pipe and therefore provides no current path between pipe sections as also providable.

An object of the invention is to provide an insulated coupling to aid in prevention of electrolytic corrosion of a pipeline.

Another object of the invention is to provide an insulated coupling for connecting grooved end pipe which prevents current flow between pipe ends having different electrical potentials.

Another object of the invention is to provide an insulated coupling for grooved end pipe which prevents current flow between pipe ends by virtue of using a material in the coupling which does not conduct electricity and, simultaneously maintains the pipe ends separated from one another.

Another object of the invention is to provide an insulated coupling operable to prevent current flow between pipe ends of grooved end pipe, the coupling fabricated of glass fiber reinforced plastic incorporating steel malleable or ductile iron, or other metal inserts for the engagement of the pipe itself.

Another object of the invention is to provide an insulated coupling member for grooved end pipe which, although rigidly and strongly engaging the pipe ends with metal keys does not conduct electricity between sections of the pipeline as the metal keys contacting each pipe end are separated by nonconducting plastic from one another.

Another object of the invention is to provide an insulated coupling adapted to prevent electrical or electrolytic corrosion of pipe, the coupling so designed that, when pressure is applied to the pipe segments, either in an attempt to push them together or pull them apart axially, the shearing action of the pipe ends trying to pull apart or force together, is applied to metal keys in the coupling without shearing force being directly applied to any plastic part of the coupling.

Another object of the invention is to provide an insulated coupling for grooved end pipe wherein the coupling is fabricated of metal keys for engaging the grooved pipe ends set into, preferably, glass fiber reinforced plastic; this latter material, while not being as strong as steel, is stronger than other plastics.

Other and further objects of the invention will appear in the course of the following description thereof.

*Detailed description*

In the drawings, which form a part of the instant specification and are to be read in conjunction therewith, embodiments of the invention are shown and, in the various views, like numerals are employed to indicate like parts.

FIG. 1 is a side, partly sectional view of a first form of insulated coupling for grooved end pipe, a portion of the pipe ends cut away to better illustrate the engagement of the coupling therewith.

FIG. 2 is a view like that of FIG. 1, but 90° displaced in orientation therefrom.

FIG. 3 is a view taken along the line 3—3 of FIG. 2 in the direction of the arrows.

FIG. 4 is a three-quarter perspective view of a gasket utilized in the structure of FIGS. 1–3, inclusive.

Figure 5:
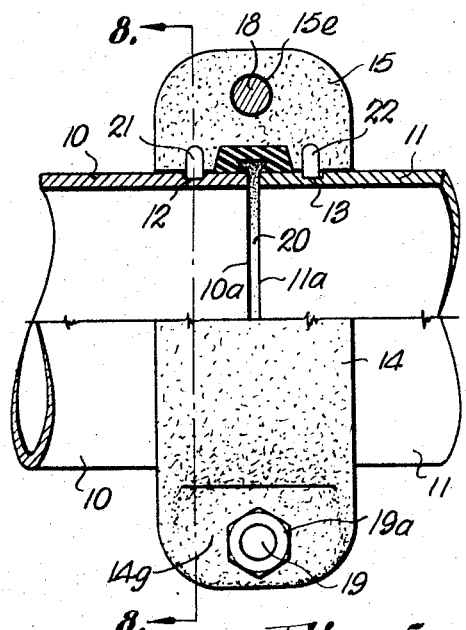
FIG. 5 is a view like that of FIG. 1, but showing a modified form of the subject insulated coupling for grooved end pipe.
Figure 6:
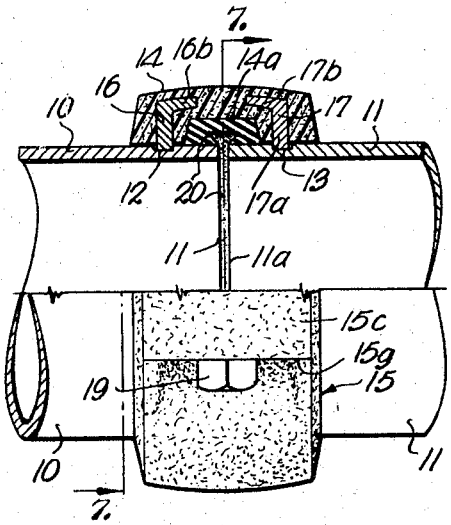
FIG. 6 is a view like that of FIG. 5, but 90° displaced in orientation therefrom.
Figure 7:
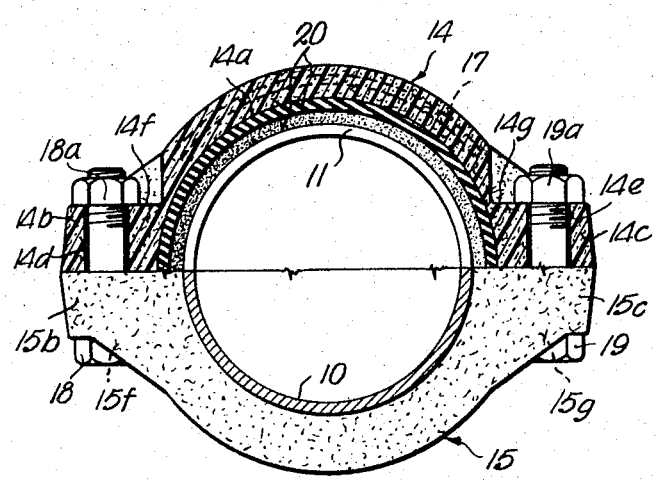
FIG. 7 is a view taken along the line 7—7 of FIG. 6 in the direction of the arrows.

Referring to the drawings and more particularly to FIGS. 5–8, inclusive, at 10 and 11 are seen the ends of two metal pipes, typically steel, having conventional circumferential grooves 12 and 13 cut thereinto for purposes of receiving pipe coupling engagement members of the general type seen in the Damsel Patent 2,362,454, issued Nov. 11, 1944, for "Pipe Coupling."

The pipe coupling construction illustrated in the views of FIGS. 5–8, inclusive, as is customary, has two halves, generally designated 14 and 15, each extending 180° in arcuate extension, the pair making up a 360° encirclement of the pipe ends to be joined. The pipe ends themselves are indicated, respectively, at 10a and 11a. The coupling housing part 14, seen from above in FIG. 5, in axial section in FIG. 6 and in transverse section in both FIGS. 7 and 8, comprises a mineral fiber or fiber glass reinforced plastic section or shell centrally grooved or hollowed as at 14a and having a pair of steel or other metal keys 16 and 17 embedded therein. Keys 16 and 17 have central or inner portions 16a and 17a, respectively, extending inwardly from the central or inner surface of the housing half 14 a distance equal to the depths of grooves 12 and 13. The outer portions of keys 16 and 17 are angled centrally as at 16b and 17b. These latter reinforcements serve to embed the keys 16 and 17 more firmly in the plastic and give a rigid structural engagement therewith.

Coupling housing halves 14 and 15 have lateral extensions 14b, 15b, 14c and 15c for the purpose of engagement and locking of the coupling housing halves together. Said extensions are perforated or have openings therethrough as seen at 14d and 14e in FIG. 7 and at 15e in FIG. 5. Platforms with flat surfaces are cut into the said extensions 14b, 14c, 15b and 15c for the purposes of receiving nuts and bolt heads as at 14f and 14g and 15f and 15g. Bolts 18 and 19 having nuts 18a and 19a thereon rigidly and removably couple the coupling housing halves together. A rubber gasket generally designated 20 of any desired form, but typically that of FIG. 4, is received in groove or hollow 14a and the corresponding space or zone in coupling housing 15.

Figure 8:
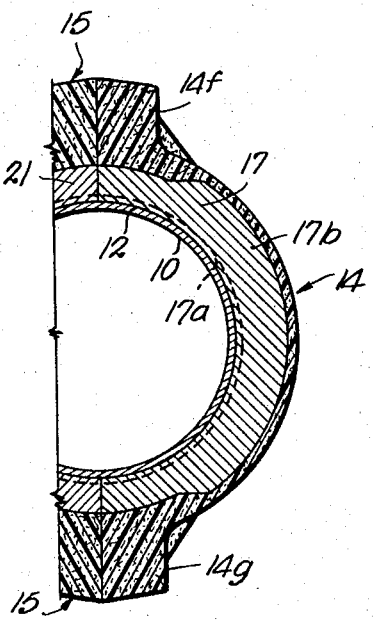
FIG. 8 is a view taken along the line 8—8 of FIG. 5 in the direction of the arrows.

It should be observed, particularly in FIG. 5, in the coupling housing zone cut by line 8—8 and in FIG. 8 itself that the portion of the key 17 which has the structural reinforcement or inwardly extending flange 17b thereon does not extend the entire 180° arc of the coupling housing 14. That is, in the zone of the coupling housing 14 where same is inwardly cut for the platforms 14f and 14g, the key 17 is relieved to a simple radial construction of the form seen in the vertical view of one end of coupling 15 seen in FIG. 5, these key structures indicated at 21 and 22.

The device of FIGS. 1–4, inclusive, shows, in addition to the structural features of FIGS. 5–8, inclusive, the use, in addition, of a steel or other metal, such as malleable or ductile iron, outer shell. This metal outer shell version, when applied to pipe and tested, withstands a much higher hydrostatic pressure than the version of FIGS. 5–8, inclusive. Additionally, the version of FIGS. 1–4, inclusive, is economically better because the metal used is stronger, stiffer and less expensive than reinforced plastic. In the modification of FIGS. 5–8, inclusive, wherein there is no metal outer shell, the body of the coupling is formed of mineral fiber or glass fiber reinforced plastic. This material, while not as strong as steel, is stronger than other plastics. For a coupling made in accordance with the disclosure of FIGS. 5–8, inclusive, it is probably the only practical substance. In the form shown in FIGS. 1–4, inclusive, other plastics could be used because the plastic portion is not so highly stressed.

Referring to FIGS. 1–4, inclusive, therein is shown a modified form of the improved insulated coupling for grooved end pipe. Again, there are shown two pipes, 30 and 31, having ends 30a and 31a which are desired to be coupled together in spaced relationship. To this end, grooves 30b and 31b, respectively, are formed by conventional methods or cut in the outer surfaces of pipes 30 and 31 at equal distances from the ends 30a and 31a thereof. A two part coupling is provided, the 180° arcuate halves thereof generally designated 32 and 33, respectively. FIG. 1 being a view from above, coupling half 32 is the upper coupling half, 33 being the lower member in FIGS. 2 and 3.

Coupling half 32, seen in axial and transverse section in FIGS. 2 and 3, has a body portion 32a of plastic material, which may be fiber glass or mineral fiber reinforced, if desired. Centrally thereof, of housing half 32, there is provided a groove or slot 32b adapted to receive a gasket 20', typically of the form seen in FIG. 4 and similar to that seen at 20 in FIGS. 5–8, inclusive. Received and embedded within the plastic body portion 32a are paired, parallel running, arcuate key members 34 and 35 in the case of housing member 32, and 34a and 35a in the case of housing member 32 and 34a and 35a in the case of housing member 33. Members 34, 34a, 35 and 35a, are each 180° in arcuate extent and are of the transverse sectional form seen in FIG. 2 in their entire length. This contrasts to the modified form seen in the structure of FIGS. 5–8, inclusive. The outer surface of body 32a is recessed as at 32c in order to receive an arcuate metal cap 36 which is bonded by epoxy resin to the plastic body portion 32a and extends thereover in 180° arcuate extension. The cap 32 has two perforated or orificed side extensions 38 and 39 having openings 38a and 39a therethrough, while housing half 33 has like side extensions 40 and 41 having like openings 40a and 41a (the latter not seen) therethrough. Bolt 42 extends through openings 40a and 38a and receives nut 43 on the other end thereof. Bolt 44 extends through openings 41a and 39a and receives nut 45 on the threaded end thereof.

The construction of the other housing coupling half 33 is identical to that of coupling half 32. That is, there is the plastic body portion 33a, the recess or groove 33b centrally for gasket 20', and outer recess or cavity 33c adapted to receive therein steel cap or cover 46, the latter of the same structure as cap 36.

Thus there has been provided insulated couplings to prevent electrolytic corrosion of the pipe. This is accomplished by preventing current flow between pipe ends which have different electric potentials. Such prevention of current flow is accomplished by using a material in the couplings which will not conduct electricity and at the same time have the coupling keep the pipe ends apart. The coupling body which contacts the outside surface of the pipe, in all parts thereof, is of plastic or glass reinforced plastic. Steel inserts are provided, mounted within the plastic coupling housing bodies which engage slots or grooves adjacent the pipe segment ends. The couplings are thus not conductors of electricity since the steel keys contacting the pipe ends are separated by a sufficient thickness of nonconducting plastic body to provide adequate electrical insulation between the keys. The plastic insulation has a dielectric strength of approximately 1000 volts per mil which thereby requires only a minimal separation in most instances.

By virtue of the steel keys engaging the floors of the grooves 12 and 13 or 30b and 31b, when internal pressure is applied to the pipe connection, the shearing action of the pipe ends trying to pull apart is applied to the steel keys. This applies also to longitudinal or axial force pushing the pipe ends together or pulling them apart. No shearing force is applied directly to any plastic part of the coupling. The reinforced plastic partially surrounds the steel inserts and holds them rigidly at all times. The coupling halves are symmetrical, one with the other.

The manufacturing process is to place the steel inserts into a mold and charge the mold with a reinforced plastic mix "pre-preg" containing approximately 70% glass and 30% resin. Pressure and heat are applied to close the mold and cure the part.

From the foregoing, it will be seen that this invention is one well adapted to attain all of the ends and objects hereinabove set forth together with other advantages which are obvious and which are inherent to the structure.

I claim:

1. A pipe coupling for joining a pair of pipe ends, each having a circumferential groove formed in the outside surface thereof adjacent the said end thereof comprising:
   a pair of coupling housing bodies each of 180° arcuate extent,
   means for connecting the coupling housings together to form a ring encircling the two said pipe ends and simultaneously enclosing each said groove in each said pipe end, said pipe ends being axially spaced from each other,
   each housing body of electrically nonconductive material,
   each housing body having a pair of metallic keys embedded in the body material thereof and extending from the inner surface thereof whereby to engage the pipe end grooves,
   said key pairs extending parallel to one another in the coupling housing, of substantially uniform inward extension from the latter and substantially of 180° arcuate extent,
   the keys curved in a portion of the length thereof in transverse section for solid engagement with said bodies,
   gasket sealing means within said coupling housing encircling both said pipe ends and engaging same circumferentially,
   the housing body on each side of each key surrounding said key and abutting against the pipe on each side of the pipe groove engaged by the key,
   said means including a metallic cap over the outside surface of each coupling housing body of 180° arcuate extent in diametric section whereby to run housing to housing yet not of such arcuate extent in axial section as to contact the pipe ends outer surfaces.

2. A pipe coupling for joining a pair of pipe ends, each having a circumferential groove formed in the outside surface thereof adjacent the said end thereof comprising:
   a pair of coupling housing bodies each of 180° arcuate extent,
   means for connecting the coupling housings together to form a ring encircling the two said pipe ends and simultaneously enclosing each said groove in each said pipe end, said pipe ends being axially spaced from each other,
   each housing body of electrically nonconductive material,
   each housing body having a pair of metallic keys embedded in the body material thereof and extending from the inner surface thereof whereby to engage the pipe end grooves,
   said key pairs extending parallel to one another in the coupling housing, of substantially uniform inward extension from the latter and substantially of 180° arcuate extent,
   the keys so shaped in an outward portion thereof as to provide a mechanical interlock with said bodies,
   gasket sealing means within said coupling housing encircling both said pipe ends and engaging same circumferentially,
   the housing body on each side of each key surrounding said key and abutting against the pipe on each side of the pipe groove engaged by the key,
   said means including a metallic cap over the outside surface of each coupling housing body of 180° arcuate extent in diametric section whereby to run housing to housing yet not of such arcuate extent in axial section as to contact the pipe ends outer surfaces.

3. A pipe coupling for joining a pair of pipe ends, each having a circumferential groove formed in the outside surface thereof adjacent the said end thereof comprising:
   a pair of coupling housing bodies each of 180° arcuate extent,
   means for connecting the coupling housings together to form a ring encircling the two said pipe ends and simultaneously enclosing each said groove in said pipe end, said pipe ends being axially spaced from each other,
   each housing body of electrically nonconductive material,
   each housing body having a pair of metallic keys embedded in the body material thereof and extending from the inner surface thereof whereby to engage the pipe end groove,
   said key pairs extending parallel to one another in the coupling housing, of substantially uniform inward extension from the latter and substantially of 180° arcuate extent,
   the keys shaped so that an outward portion thereof provides a mechanical interlock with said bodies,
   gasket sealing means within said coupling housing encircling both said pipe ends and engaging same circumferentially,
   the housing body on each side of each key surrounding said key and abutting against the pipe on each side of the pipe groove engaged by the key.

References Cited

UNITED STATES PATENTS

| | | | |
|---|---|---|---|
| 2,201,372 | 5/1940 | Miller | 285—340 X |
| 2,225,208 | 12/1940 | Crickmer | 285—373 X |
| 2,230,725 | 2/1941 | Nathan | 285—340 X |
| 2,439,979 | 4/1948 | Krooss | 285—423 X |
| 2,463,235 | 1/1949 | Andrews | 285—373 X |
| 2,766,518 | 11/1956 | Costanzo | 285—373 X |
| 3,078,108 | 2/1963 | Smith | 285—373 X |

FOREIGN PATENTS 1,335,121  7/1963  France.

CARL W. TOMLIN, Primary Examiner.

D. W. AROLA, Assistant Examiner.

U.S. Cl. X.R.

285—112, 373, 423